United States Patent
Downing

[11] 3,709,205
[45] Jan. 9, 1973

[54] SHUTTLE TYPE LIQUID FUEL METERING DEVICE

[75] Inventor: Eric William Downing, Solihull, England

[73] Assignee: Joseph Lucas (Industries) Limited, Birmingham, England

[22] Filed: July 20, 1971

[21] Appl. No.: 164,311

[30] Foreign Application Priority Data

July 22, 1970 Great Britain..................35,415/70

[52] U.S. Cl. ...........123/139 AM, 417/292, 417/293, 123/139 R, 222/250
[51] Int. Cl. ........................F02m 39/00, F02b 3/00
[58] Field of Search ......123/139 AM; 417/292, 293; 222/250

[56] References Cited

UNITED STATES PATENTS

| | | |
|---|---|---|
| 2,965,092 | 12/1960 | De Claire.....................123/139 AM |
| 400,401 | 3/1889 | Gutzkow........................222/250 |
| 3,058,425 | 10/1962 | Evans.........................222/250 |
| 2,883,088 | 4/1959 | Downing....................123/139 AM |

Primary Examiner—Laurence M. Goodridge
Assistant Examiner—Ronald B. Cox
Attorney—Holman & Stern

[57] ABSTRACT

A shuttle-type metering device for controlling a liquid fuel supply to an internal combustion engine has a pair of shuttles slidable within a rotor and defining three chambers in the rotor, three ports in the rotor open into the respective chambers. A stationary sleeve surrounds the rotor and has three rows of ports with which the rotor ports respectively and successively communicate as the rotor rotates. Each row of sleeve ports has an even number of ports which are alternately arranged as inlet and outlet ports. The porting arrangement is arranged to supply fuel to an engine having an odd number of cylinders.

4 Claims, 7 Drawing Figures

INVENTOR
Eric William Downing

ATTORNEYS

| ROW A | SHUTTLE 16 | ROW B | SHUTTLE 17 | ROW C |
|---|---|---|---|---|
| IN | → | | → | OUT |
| OUT | ← | IN | | |
| | | OUT | ← | IN |
| | | IN | → | OUT |
| IN | → | OUT | | |
| OUT | ← | IN | | |
| | | OUT | ← | IN |

FIG.5.

| A | B | C |
|---|---|---|
| IN | | OUT |
| OUT | IN | |
| | OUT | IN |
| | IN | OUT |
| | OUT | IN |
| | IN | OUT |
| | OUT | IN |

FIG.6.

| A | B | C |
|---|---|---|
| IN | | OUT |
| OUT | IN | |
| IN | OUT | |
| OUT | IN | |
| IN | OUT | |
| OUT | IN | |
| | OUT | IN |

FIG.7.

INVENTOR
Eric William Downing

ATTORNEYS

SHUTTLE TYPE LIQUID FUEL METERING DEVICE

This invention relates to shuttle-type fuel metering devices and has as an object to provide such a device in a convenient form.

According to the invention a device for metering liquid fuel to an internal combustion engine having an odd number of cylinders comprises a rotor having an axial bore, a pair of shuttles slidable within the bore, a pair of stops at respective ends of the rotor, the shuttles and stops defining three chambers within the rotor, three ports at axially spaced locations in the rotor and respectively opening into the said chambers, a sleeve surrounding the rotor and three rows of ports in the sleeve, the said rows being at axially spaced locations which substantially coincide with the locations of the ports in the rotor, whereby the ports in the rotor successively communicate, in use, with the ports of a corresponding row in the sleeve, each of the said rows having an even number of ports positioned at selected ones of a plurality of angularly spaced locations about the sleeve axis, the number of such locations in each row corresponding to the number of cylinders in an engine with which the device is intended for use, the ports in each row forming an equal number of inlet and outlet ports, each outlet lying at the next adjacent location to an inlet port in the same row and the arrangement being such that, except at a single angular position of the rotor with respect to the sleeve, when a port in the rotor communicates with an inlet port, the next adjacent port in the rotor communicates with an outlet port and that, at the said single angular position, when one end port on the rotor communicates with an inlet port, the other end port on therotor communicates with an outlet port.

A metering device according to the invention will now be described by way of example and with reference to the accompanying drawings in which:

FIG. 5 shows in tabular form the operating sequence of the device of FIGS. 1 to 4, and FIGS. 6 and 7 show in tabular form porting arrangements of alternative examples of the device.

Figure 1:
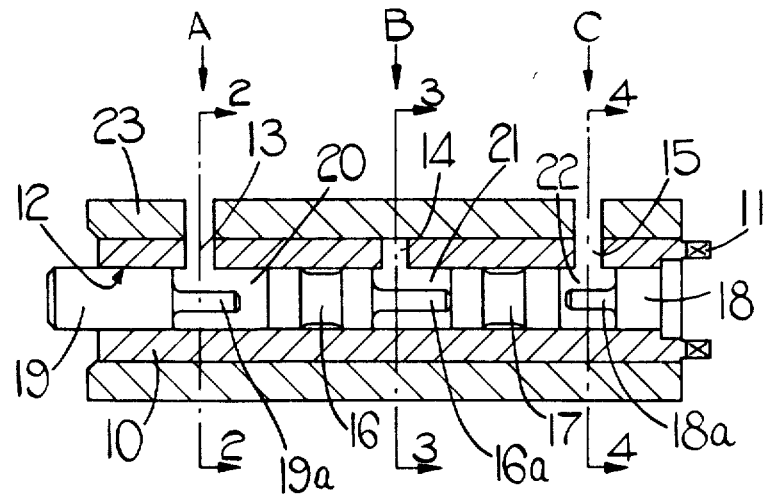
FIG. 1 is a longitudinal section through a metering device.

A rotor 10 is formed at one end with dogs 11 for engagement with complementary dogs on a shaft driven by an associated engine. The rotor 10 has an axial bore 12 and three parallel radial ports 13, 14, 15 communicating with the bore 12 at axially spaced locations. A pair of piston-like shuttle members 16, 17 are slidable within the bore 12. A fixed stop 18 and an adjustable stop 19 are mounted at opposite ends of the bore 12 and combine with the shuttle members 16, 17 to define three chambers 20, 21, 22 within the rotor 10, with which chambers the ports 13, 14, 15 respectively communicate. Stems 16a, 18a and 19a extend from the shuttle member 16 and stops 18, 18 respectively so as to define minimum volumes for the chambers 20, 21, 22.

Figures 2, 3:
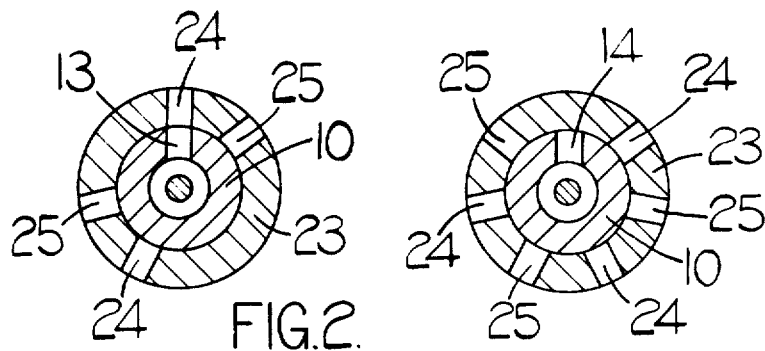
FIGS. 2, 3 and 4 are sections on the corresponding lines in FIG. 1.
Figure 4:
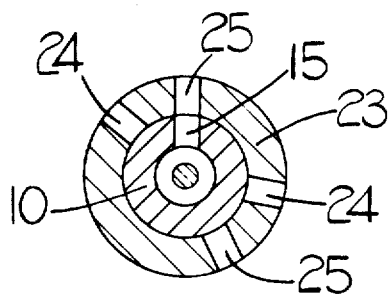

The rotor 10 is mounted within a sleeve 23 which is formed with three rows A,B,C of ports, the axial locations of the rows corresponding to the axial locations of the ports 13, 14, 15. The metering device of the example is intended for use with a seven cylinder engine and the ports in each row lie, as shown in FIGS. 2, 3 and 4, on selected ones of seven equi-spaced radial axes extending from the axis of the sleeve 23. Each row has an even number of ports, half the ports in each row being inlet ports 24 and half being outlet ports 25. There is a total of seven inlet ports 24 and seven outlet ports 25. Each outlet port 25 lies on the next adjacent axis, in a clockwise direction as seen in FIGS. 2, 3 and 4, to an inlet port 24. Moreover the axis of an inlet port 24 in any row is parallel with the axis of an outlet port 25 in the next adjacent row, except at one radial location, the axis of inlet port 24 shown at the top of FIG. 2 being parallel to the axis of outlet port 25 shown at the top of FIG. 4.

In use, fuel is supplied to the inlet ports 24 and the rotor 10 is rotated within the sleeve 23 so that rotor ports 13, 14, 15 successively communicate with ports 24, 25 in the respective rows. The operating sequence of the device is shown in tabular form in FIG. 5, starting with the rotor position shown in FIGS. 1 to 4. It will be seen that the shuttles 16, 17 move in unison only once in every complete rotation of the rotor 10 within the sleeve 23, i.e., when the ports 13, 15 are in simultaneous communication with ports in the sleeve 23. Movement of the shuttles 16, 17 under the influence of fuel pressure applied to ports 24 causes fuel to be sequentially discharged from the ports 25 to the engine cylinders.

It will be understood that the axes of ports 13, 14, 15 need not be parallel, but may have relative angular displacement around the rotor 10, in which case the ports 24, 25 in the associated rows will have a corresponding angular displacement.

It will be understood that alternative arrangements of the ports 24, 25 may be formed in the rotor 10, provided that an outlet port in any row lies adjacent an inlet port, that a pair of ports in the rotor 10 can communicate simultaneously with a respective inlet port 24 and an outlet port 25, and that, except in one position of the rotor this simultaneous communication is with inlet and outlet ports in adjacent rows. FIGS. 6 and 8 show in tabular form alternative arrangements of inlet ports 24 and outlet ports 25 in sleeve 23, both the arrangements being for use with a seven cylinder engine.

I claim:

1. A device for metering liquid fuel to an internal combustion engine having an odd number of cylinders, comprising a rotor having an axial bore, a pair of shuttles slidable within the bore, a pair of stops at respective ends of the rotor, the shuttles and stops defining three chambers within the rotor, three ports at axially spaced locations in the rotor and respectively opening into the said chambers, a sleeve surrounding the rotor and three rows of ports in the sleeve, the said rows being at axially spaced locations which substantially coincide with the locations of the ports in the rotor, whereby the ports in the rotor successively communicate, in use, with the ports of a corresponding row in the sleeve, each of the said rows having an even number of ports positioned at selected ones of a plurality of angularly spaced locations about the sleeve axis, the number of such locations in each row corresponding to the number of cylinders in an engine with which the device is intended for use, the ports in each row forming an equal number of inlet and outlet ports, each outlet lying at the next adjacent location to an inlet port in the same row and the arrangement being such that, except at a single angular position of the rotor with respect to the sleeve, when a port in the rotor communicates with an inlet port, the next adjacent port in the rotor communicates with an outlet port and that, at the said single angular position, when one end port on the rotor communicates with an inlet port, the other end port on the rotor communicates with an outlet port.

2. A device as claimed in claim 1 in which the said locations about the sleeve axis are equi-angularly spaced.

3. A device as claimed in claim 1 in which the ports in the rotor are parallel.

4. A device as claimed in claim 1 in which one of the said stops is adjustable.

* * * * *